Jan. 15, 1924. 1,480,709
C. LE G. FORTESCUE
BALANCED PHASE CONVERTING SYSTEM
Filed Sept. 16, 1918 3 Sheets-Sheet 1

WITNESSES:
H.B.Funk,
J.C.Davis

INVENTOR
Charles Le G. Fortescue.
BY
ATTORNEY

Patented Jan. 15, 1924.

1,480,709

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

BALANCED PHASE-CONVERTING SYSTEM.

Application filed September 16, 1918. Serial No. 254,312.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Balanced Phase-Converting Systems, of which the following is a specification.

My invention relates to phase-converting systems of the self-balancing type, particularly those systems wherein, for balancing, the phase-sequence of the generated electromotive forces is in effect reversed so as to accord with the phase-sequence of the load drops, and it has for its object to provide a system of the character designated that shall permit the return of wattless current to the line in a simple and effective manner without unbalancing the system itself.

Figure 1:
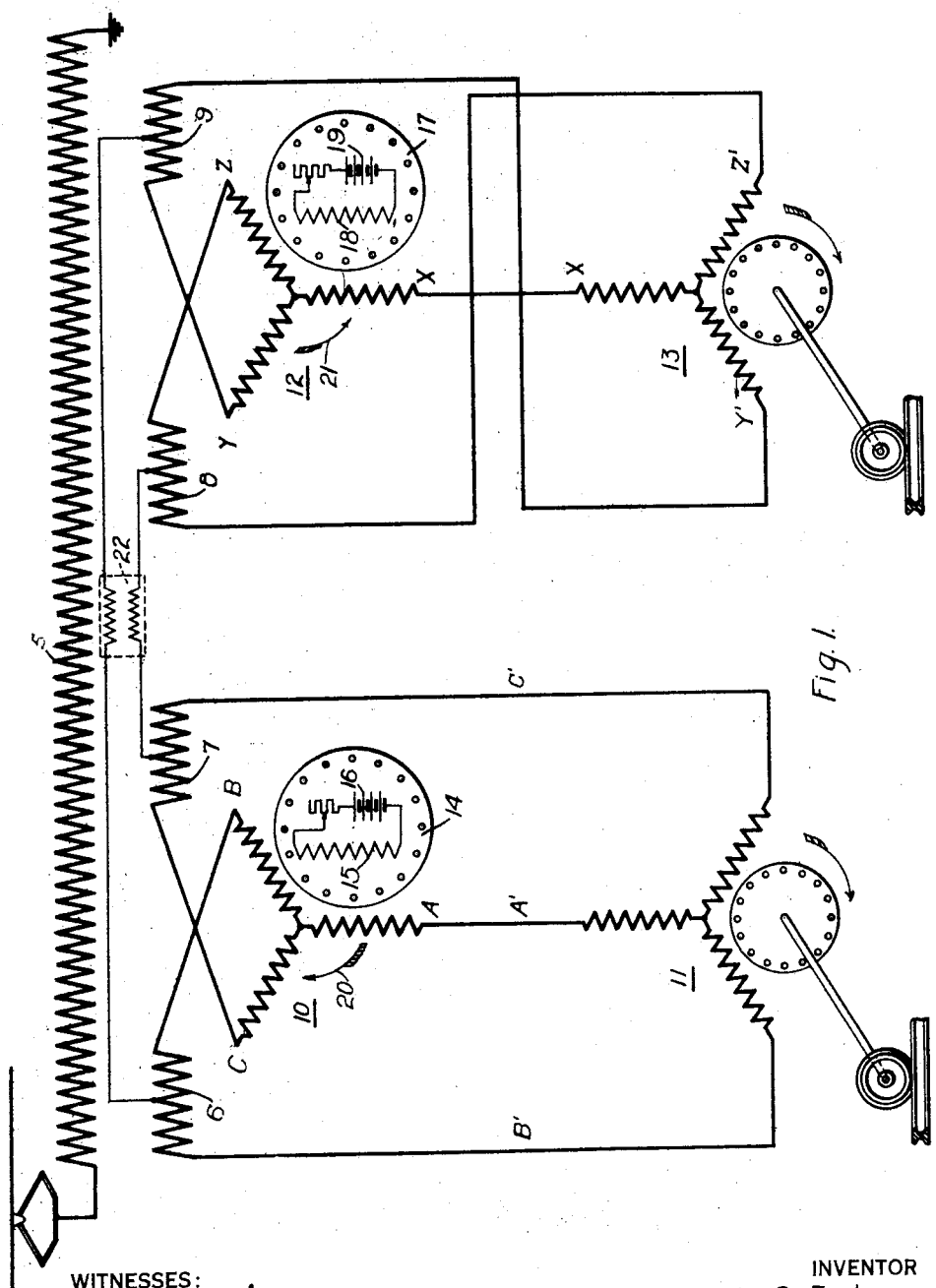
Figure 2:
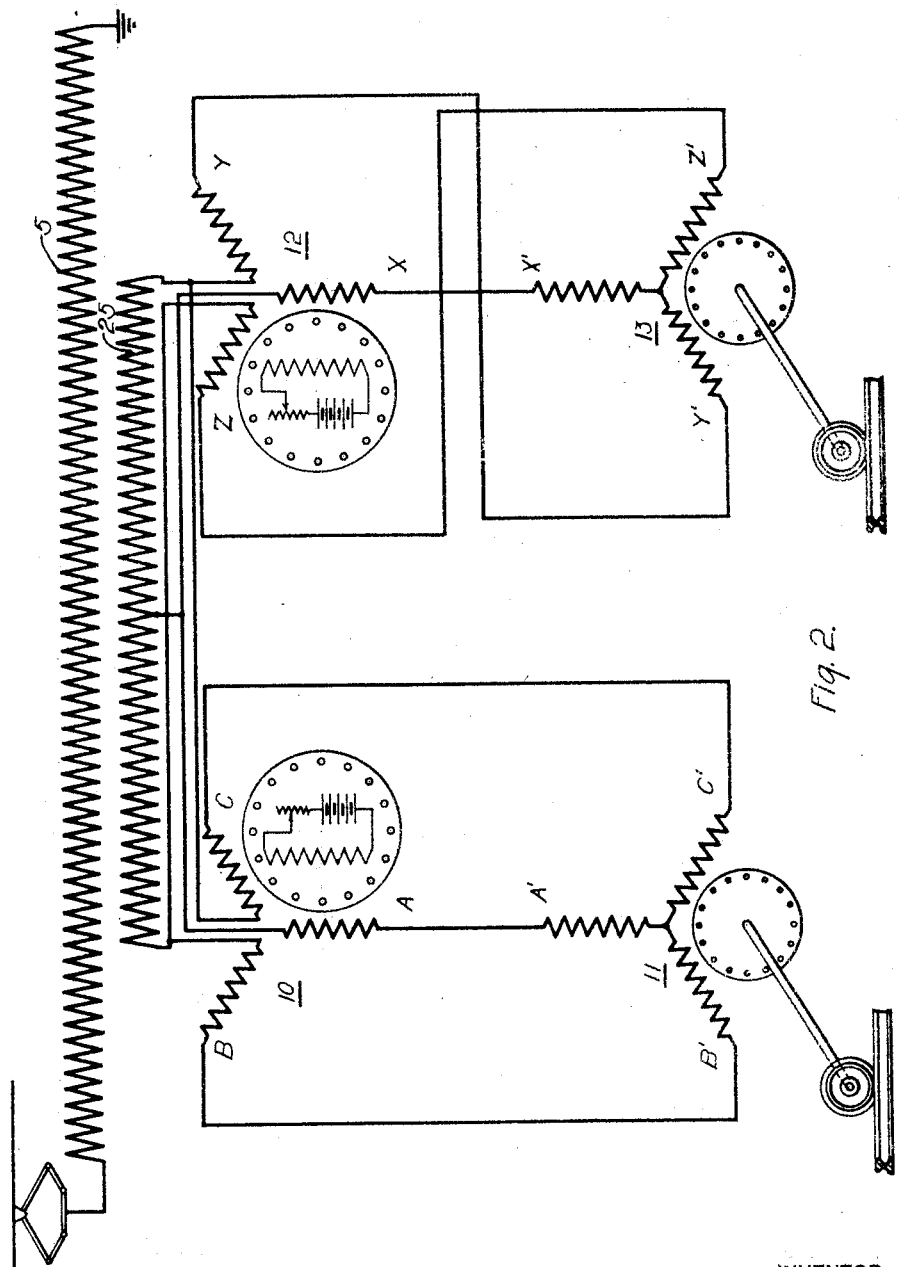
Figure 3:
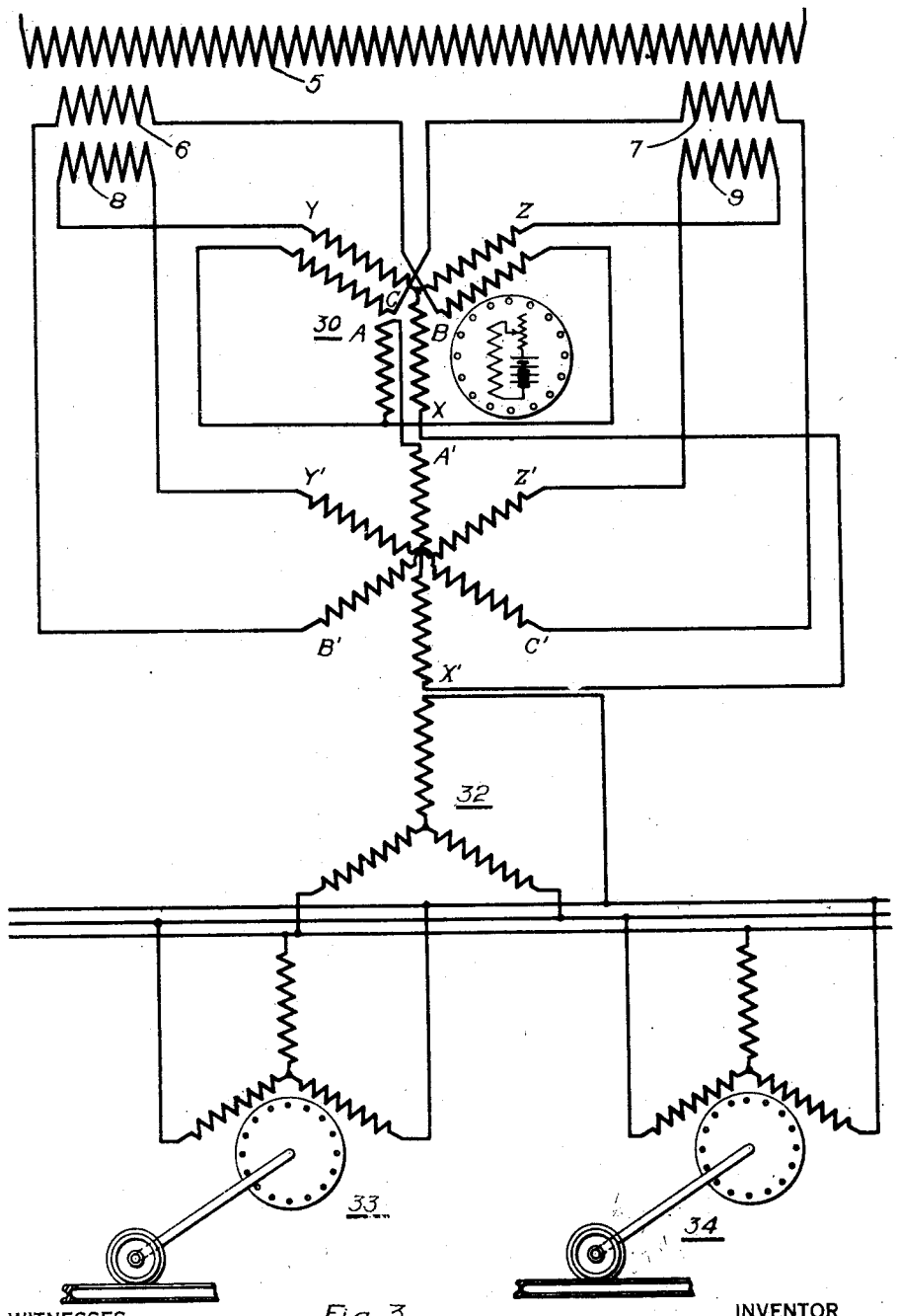

In the accompanying drawing, Fig. 1 is a diagrammatic view of two phase-converters, together with associated supply and load circuits and auxiliary apparatus, embodying a preferred form of my invention; and Figs. 2 and 3 are diagrammatic views, similar to Fig. 1 and illustrating other embodiments of my invention.

It is known that the phase sequence of the generated electromotive forces of a phase-converter of the rotary type is opposite to the phase sequence of the voltage drops therein. Each of these component polyphase systems is balanced in itself but the combination of the two systems having opposite phase sequence is an unbalanced system of output electromotive forces for the converter, the degree of unbalanced being determined by the magnitude of the drops and, therefore, by the load.

In a copending application, Serial No. 206,921, filed Dec. 13, 1917, by L. W. Chubb and assigned to the Westinghouse Electric & Manufacturing Company, and in my copending application, Serial No. 206,932, filed Dec. 13, 1917 are described and claimed systems of phase-converter connections wherein transformer electromotive forces are so employed as to produce the effect of reversing the phase sequence of the generated electromotive forces of the converter, thus causing the generated converter electromotive forces to have in effect the same phase sequence as the drop voltages within the converter. Obviously, the combination of the generated electromotive forces, having reversed phase-sequence, with the drop electromotive forces produces a balanced result, since each of the two systems is balanced and each now has the same phase-sequence.

The desired degree of balance may be secured with the systems of either of the aforementioned applications by the proper secondary excitation of the phase-converter but, when it is attempted to supply wattless current to a supply system from the converter by the over-excitation of the secondary member thereof, in order to improve the power factor of the system, the converting system is at once unbalanced, as will appear from the following considerations. The converting system acts as a polyphase supply system for the single-phase wattless current furnished to the single-phase supply circuit and it is well known that single-phase currents cannot be drawn from a polyphase system without unbalancing the system, as the single-phase current may be resolved into two oppositely rotating components, one of which has the same phase sequence as the currents of the polyphase system and the other of which, having the opposite phase-sequence, produces a marked unbalance.

I find that, if a given amount of energy is to be converted from single-phase form into polyphase form, and, at the same time, if it is desired to supply wattless current to the single-phase supply for the improvement of the power factor thereof, the desired effect may be produced without unbalancing by employing two converting systems so dynamically interlinked as to have mutually opposite phase-sequence for their resultant electromotive forces and each arranged to convert one-half the desired amount of energy. The theory of operation is as follows: The single-phase wattless current may be resolved into two equal components having opposite phase sequence or phase rotation. As the output electromotive forces of the two phase-converting systems have the opposite phase sequence, it follows that the single-phase components may be derived from the respective converter systems, the component, in each case, being taken from the system having the same phase-sequence. Obviously, any desired amount of wattless current may be drawn, in this manner, from a converting system without unbalance thereof.

Referring to Fig. 1 of the accompanying drawing for a more detailed understanding of my invention, I show a source of single-phase alternating current at 5, such, for example, as the primary winding of a locomotive transformer, this winding being connected between trolley and ground. Four secondary windings 6, 7, 8 and 9 are mounted in inductive relation to the primary winding 5.

A phase-converter 10 of the well-known rotary type is arranged to derive energy from the secondary windings 6 and 7 and to supply polyphase current to a propulsion motor 11, and, in like manner, a similar converter 12 is arranged to derive energy from the secondary windings 8 and 9 to supply polyphase current to a propulsion motor 13.

The converter 10 is shown as provided with three stator phase divisions, designated, respectively, as A, B and C phases, the B and C phases being shown employed as a primary winding and the A phase as a tertiary winding. The secondary winding of the converter 10 is shown as embodying a squirrel-cage winding 14 and an auxiliary winding 15 through which direct current may be passed, as from a source 16, for synchronous operation.

The propulsion motor 11 is provided with a three-phase primary winding, the respective phase-divisions of which are designated respectively A', B' and C' to accord, respectively, with the immediately associated phase-divisions of the converter 10.

The connections between the phase-divisions B and C of the converter 10 and the phase-divisions B' and C' of the motor 11 include the supply windings 6 and 7, whereby the phase sequence of the output generated electromotive forces of the converter 10 is in effect reversed and the output electromotive forces are balanced under all conditions of load, as explained in detail in the aforementioned Chubb application, this action being produced by causing the direction of phase-sequence of the generated electromotive forces to accord with that of the phase-sequence of the converter drops, as set forth above.

In like manner, the converter 12 is shown as embodying three phase-divisions designated respectively as X, Y and Z, the Y and Z phase-divisions being employed as a primary winding and the phase-division X being employed as a tertiary winding. The secondary member of the converter 12 is similar to that of the converter 10, embodying a squirrel-cage winding 17 and an auxiliary winding 18 is arranged to be excited by unidirectional current from a source 19.

The respective phase-divisions of the converter 12 are connected to the respective primary phase-divisions X', Y' and Z' of the motor 13 so as to obtain balanced operation, as previously described.

Let it now be assumed that it is desired to correct the power-factor of the single-phase supply system by deriving single-phase wattless current from the converting aggregate. To this end, the auxiliary windings 15 and 18 are over-excited, as is usual in synchronous condensers, and a component wattless current is generated in each converting system.

The mid-point of the transformer secondary winding 6 is connected to the mid-point of the secondary winding 9 and, in like manner, the mid-points of the secondary windings 7 and 8 are interconnected. Furthermore, these mid-point connections are mutually interlinked, as by an auxiliary transformer 22.

Thus, the two-phase-converting systems are dynamically interlinked and the interconnection is such that the phase-sequence of the two systems are opposite to each other, as combined in the interconnection, the phase-sequence of the converter 10 being clockwise, as indicated by an arrow 20 and that of the converter 12 being counter-clockwise, as indicated by an arrow 21. Thus, the component wattless currents derived from the converters have opposite phase sequence with respect to each other and, therefore, they combine to produce the desired single-phase wattless current in the supply system. The component derived from each converting system has the same phase-sequence as the resultant electromotive forces of said system and thus readily coalesces therewith without unbalancing, irrespective of its magnitude.

While the above explanation of the operation is correct from an analytical viewpoint, the actual operation is rendered possible by the flow of circulating currents through the respective transformer winding and the auxiliary interconnections, in a manner that need not be discussed in detail.

It will be observed that, as the output electromotive forces of the two converters have opposite phase-sequence, it is necessary to reverse the leads between the converter 12 and the motor 13, as indicated, so that the motor 13 may be operated in the same direction as the motor 11, as required for locomotive operation.

Referring to Fig. 2, the general arrangement of the entire converter aggregate is as in Fig. 1 but the respective converter units are connected as shown in my above-mentioned application, rather than as shown in the Chubb application, in that the converter windings are open at the mid point rather than at the secondary winding of the supply transformer. Thus, the converter 10 has its respective phase-divisions independent of each other. The tertiary phase-division A is connected directly between the mid-point of a single secondary winding 25 and the phase-division A' of the motor 11, the remaining or primary phase-divisions of the converter 10 being connected between the respective terminals of the secondary winding 25 and the remaining terminals of the motor 11. The converter 12 is similarly connected between the transformer secondary winding 25 and the motor 13. It is believed that the operation of the system shown in Fig. 2 requires no further description, as it is indentical with that of the system of Fig. 1 in so far as the objects of this invention are concerned.

The systems shown to this point have employed two separate converter machines for the attainment of the desired result but, if desired, a single primary-tertiary core structure, together with a single secondary member, may be employed, two separate primary and two separate tertiary windings being applied to the common core structure but with the opposite phase-sequence.

Thus, in the system of Fig. 3, a transformer winding 5 is inductively interlinked with four secondary windings 6, 7, 8 and 9. A phase-converter 30 is provided having a three-phase stator winding A—B—C and an additional three-phase stator winding X—Y—Z. As shown, the phase-divisions B, C, Y and Z are connected for primary operation, and the phase-divisions A and X for tertiary operation, the electromotive force of the phase-division B being 180° removed from that of the phase division Z, that of the phase division C being removed 180° from that of the phase division Y and that of the phase-division A being removed 180° from that of the phase-division X.

Thus six-phase electromotive forces may be derived from the transformer secondary windings and the associated composite converter, these electromotive forces being shown as applied to a six-phase winding A', Z', C', X', B', Y'. This winding may represent the primary winding of a six-phase induction motor or it may represent the primary winding of a six-phase-three-phase transformer, the secondary winding of which is shown at 32, supplying energy to three-phase propulsion motors 33 and 34.

It will be noted that the phase-sequence of the windings A, B and C is opposite to that of the windings X, Y and Z whereby, if the auxiliary winding 31 of the secondary member of the machine 30 be over-excited for the correction of the power-factor of the source 5, a component of the corrective electromotive force will be derived from one portion of the converter aggregate, having the appropriate phase-sequence, and the remaining component of the single-phase electromotive force will be derived from the remaining portion of the converter and have the other appropriate phase-sequence.

Certain of the broader features of my invention, relating to the operation of the over-excited balancer machines as a source of either single-phase wattless currents or single-phase energy, are covered by my co-pending application, Serial No. 442,763, filed Feb. 5, 1921, for phase converters for single-phase currents.

In the subjoined claims, I shall set forth two polyphase systems and I contemplate that this expression shall cover equally the two distinct polyphase systems of Figs. 1 and 2 and the two component polyphase systems which together make up the six-phase system of Fig. 3.

While I have shown my invention in three embodiments, I desire it to be considered as of general application to any converting systems of the character in question, such converting systems being shown, for example, in the figures of the aforementioned copending applications.

While I have shown my invention in its preferred form, it will be obvious to those skilled in the art that it is susceptible of various minor changes and modifications without departing from the spirit thereof and I desire, therefore, that only such limitations shall be placed thereupon as are imposed by the prior art or are specifically set forth in the appended claims.

I claim as my invention:

1. The method of producing single-phase current which comprises dynamically combining a system of polyphase currents having a given phase-sequence with another system of polyphase currents having the same phase-number but the opposite phase-sequence, generating the desired single-phase current by the resultant alternating energy, and providing for the flow of currents between the two systems in such manner as to maintain substantially balanced conditions in the systems.

2. The method of deriving single-phase current from two systems of polyphase currents of like phase-number without unbalancing said systems which comprises dynamically combining a balanced component of currents from one system with an equal balanced component of currents from the other system, said components each having the phase-sequence of their respective systems but being combined in relatively opposite phase-sequence, generating the desired single-phase currents by the resultant alternating force, and providing for the flow of only substantially balanced currents in said polyphase systems.

3. The combination with two balanced polyphase systems of like phase-number, of means for deriving equal balanced polyphase components of current from each system, respectively, means for dynamically combining said components with opposite phase-sequence, whereby an alternating force is produced, means for generating a single-phase current by said alternating force, and means for providing for the flow of currents between the two systems in such manner as to maintain substantially balanced conditions in the systems.

4. The combination with two balanced polyphase systems of like phase-number, of means for deriving equal balanced polyphase components of current from each system, respectively, a core member, means for producing a rotative magnetic field in said core member from each polyphase component, respectively, said fields having the opposite phase rotation, whereby a resultant alternating magnetic field is produced in said core member, means for generating single-phase current by said resultant field, and means for selectively impeding the flow of unbalancing components of currents in said polyphase systems.

5. The combination with a single-phase alternating current system, of two polyphase alternating-current systems adapted to either receive or to give out energy, phase-converting means having opposite phase-sequence inter-connecting said polyphase systems to said single-phase system, respectively, and means whereby wattless current may be supplied to said single-phase system from said polyphase system, a component of said single-phase current being derived from one polyphase system and an equal component having the opposite phase-sequence being derived from the other polyphase system, the phase-sequence of each component being that of the currents of the corresponding polyphase system.

6. The combination with a source of single-phase alternating current, of two phase-converter aggregates of the dynamo-electric type embodying primary members arranged to be energized from said source, tertiary members, and secondary inducing means, polyphase load circuits connected to said source and to said tertiary windings, respectively, means for adjusting the secondary field excitation of each converter aggregate so that a component of polyphase wattless current is produced therein for return to said source, means for dynamically combining the two component polyphase wattless currents thus produced in mutually opposite phase-sequence, whereby an alternating force is produced thereby, and means for producing wattless current in said source in accordance with said force.

7. The combination with a source of single-phase alternating current, of a transformer embodying a primary winding and a plurality of secondary windings, said primary winding being connected to said source, two phase-converter aggregates of the dynamo-electric type and having their primary windings connected to said transformer secondary windings, respectively, two polyphase load circuits connected to be energized through said converters, respectively, means for so exciting the secondary members of said converters that each load circuit tends to return wattless current to said source through its associated converter, and means interconnecting said secondary transformer windings, whereby said polyphase currents are combined in mutually opposite phase-sequence and wattless current supplied to said source without unbalancing said load circuits.

8. The combination with a source of single-phase alternating current, of a transformer embodying a primary winding and an even number of secondary windings, connections from the primary winding of said transformer to said source, two phase-converters of the dynamo-electric type comprising primary, secondary and tertiary windings, two polyphase load circuits, connections between each converter and one of said load circuits, respectively, each set of connections traversing one-half the transformer windings, respectively, in such manner that the transformer secondary electromotive forces reverse the phase-sequence of the output electromotive forces of the converters, means for dynamically interlinking the two converter systems in opposite phase-sequence, and means for adjusting the secondary excitation of said phase-converters, whereby the power-factor of said source may be modified without unbalancing said load circuits.

9. The combination with a single-phase translating device, of balanced polyphase means for interchanging energy therewith, and series-connected balancer means of the synchronous dynamo-electric machine type having good damper windings and having a total of an even number of phases so related as to provide for the interchange of wattless current between said single-phase translating device and said polyphase means without substantially unbalancing said polyphase means.

10. The combination of a pair of three-phase induction machines of opposite phase-sequence, of a pair of backwardly rotating series balancers of the synchronous-machine type associated with said induction machines respectively, single-phase transformer means serially connected in circuit with said three-phase machines, respectively, for the interchange of single-phase power and substantially balanced three-phase power, and interconnecting means connecting the transformer means of one induction machine with the transformer means of another induction machine for the circulation of substantially balanced wattless currents originating in said balancers.

11. The combination with a pair of three-phase systems each having a phase balancer, said phase balancer having a serially connected primary member in circuit with its associated system and a backwardly rotating damper member, of single-phase transformer means serially connected with said phase balancers, respectively, for the interchange of single-phase power and substantially balanced three-phase power, and interconnecting means connecting the transformer means of one phase balancer with the transformer means of another phase balancer for the circulation of substantially balanced wattless currents originating in said balancers.

12. The combination of a pair of similar three-phase induction motors connected to the same mechanical load for either motoring or regenerating, a single-phase transmission line, transformer means having two secondary windings for each of said motors, a three-phase series balancer machine for each of said motors, each of said balancer machines having a damper winding rotating backwardly with respect to the direction of phase rotation of its associated motor, one phase of each series balancer being directly connected to one phase of its associated motor, the other phases of each series balancer being connected to the other phases of its associated motor through the associated secondary windings, respectively, and one-to-one transformer means connecting the mid-points of the secondary windings of one motor to the mid-points of the secondary windings of the other motor in such order as to provide for the circulation of substantially balanced wattless currents originating in said series balancer machines.

13. The combination with a single-phase system, of two three-phase systems, balancing mechanism, said mechanism comprising a three-phase primary winding connected in series with each of said three-phase systems and damping secondary windings cooperating with said primary windings and rotating backwardly at synchronous speed, connections between said single-phase system and two phases of each of said three-phase systems, connections between the two remaining phases of the respective three-phase systems, and means for overexciting said balancing mechanism.

14. The combination with a single-phase system, of two three-phase systems, balancing mechanism, said mechanism comprising a three-phase primary winding connected in series with each of said three-phase systems and damping secondary windings cooperating with said primary windings and rotating backwardly at synchronous speed, connections between said single-phase system and two phases of each of said three-phase systems, connections between the two remaining phases of the respective three-phase systems, means for overexciting said balancing mechanism and means interconnecting neutral points in said single-phase system and in said balancing mechanism for providing for the circulation of wattless currents without substantially unbalancing said three-phase systems.

In testimony whereof, I have hereunto subscribed my name this 31st day of Aug. 1918.

CHARLES LE G. FORTESCUE.